Nov. 10, 1931.  G. W. VEALE  1,831,273
BUMPER
Filed July 3, 1930
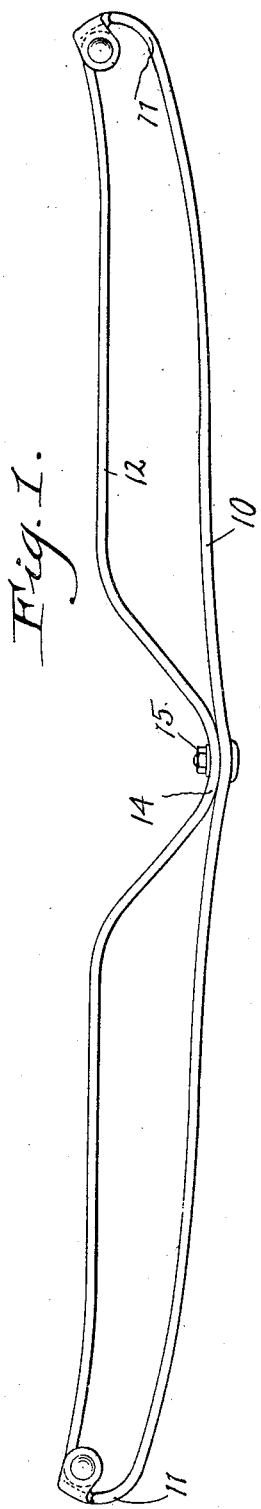
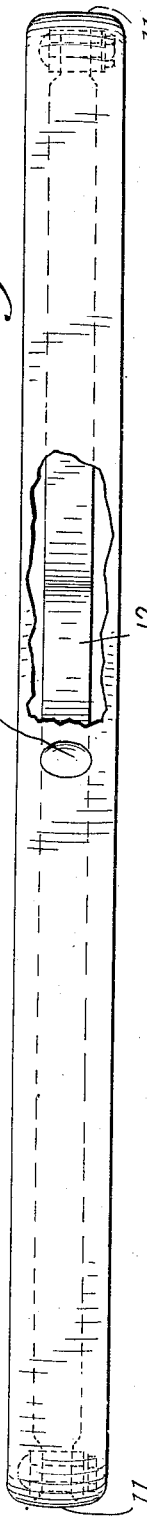
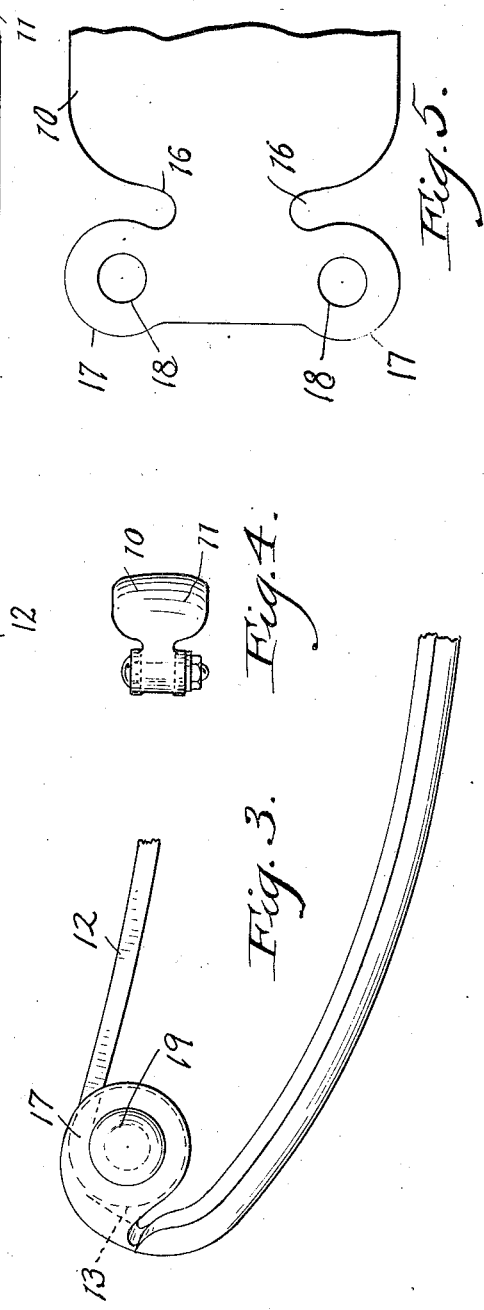
Inventor:
George W. Veale
Rivers Hudson & Kent
attys Patented Nov. 10, 1931

1,831,273

UNITED STATES PATENT OFFICE

GEORGE W. VEALE, OF CLEVELAND HEIGHTS, OHIO, ASSIGNOR TO THE EATON AXLE AND SPRING COMPANY, OF CLEVELAND, OHIO, A CORPORATION OF OHIO

BUMPER

Application filed July 3, 1930. Serial No. 465,557.

This invention relates to bumpers for automobiles and the like, and more particularly to certain improvements in devices for connecting the ends of the impact bar and the rear or supporting bar of the bumper.

It is one of the objects of the invention to provide an end construction that will be especially adapted for bumpers embodying a single, wide-faced impact bar.

It is a further object of the invention to provide an end construction that will be neat in appearance, present a smooth convex impact surface and be comparatively simple and inexpensive to manufacture.

Other objects of the invention and the features of novelty will be apparent from the following description taken in connection with the accompanying drawings, of which, Figure 1 is a plan view of a bumper embodying my invention.

Fig. 2 is a front elevation thereof with a portion broken away to expose the rear or supporting bar.

Fig. 3 is an enlarged plan of one of the ends of the bumper.

Fig. 4 is an end view, and

Fig. 5 is an elevation of one end of the impact bar, as it appears at one stage of its manufacture, the view illustrating the manner of forming the ears by which the impact bar is connected with the end of the rear bar.

Referring to the drawings, 10 indicates the impact bar, the ends of which are well rounded to present convex impact surfaces, as indicated at 11. The rear or supporting bar is indicated at 12 and may be of any preferred shape, but is preferably provided with eyes 13 at its ends. The central portion of the rear bar 12 may be bent forwardly into engagement with the rear face of the impact bar 10, as indicated at 14, and secured thereto by any suitable means such as the bolt 15.

Referring to Fig. 5, it will be noted that the end of the impact bar 10 is provided with notches 16 in its upper and lower edges and is suitably punched to form the ears 17 having the holes 18 therein. These operations will preferably to performed before the impact bar is bent into its final shape. The ears 17 are then bent into substantially right angular relation to the face of the impact bar to thereby provide a pair of vertically spaced lugs or ears between which the eyes 13, on the ends of the rear bar 12, may be positioned. Pintles 19 are inserted through the holes 18 and the associated eyes 13 to form pivotal connections between the ends of the two bars. These pintles may be in the form of bolts or rivets, as shown.

It will be noted that the ears 17 are directed inwardly behind the impact surface of the bar 10, so that the end of the bumper is well rounded, neat in appearance and of substantial construction.

While I have shown my invention embodied in a bumper adapted to extend across the full width of the automobile, such illustration is not intended to limit the invention to this type of bumper, as it is obvious that the invention is equally applicable to bumperettes and bumpers of the type in which the impact bar does not extend across the full width of the automobile.

Having thus described my invention what I claim is:

1. In bumper construction, the combination of an impact bar having a pair of integral vertically spaced ears at each end, the lower ears of said pairs being located substantially above the lower edge of said bar and the upper ears being located substantially below the upper edge of said bar, a rear bar having eyes at its ends each positioned between one of said pairs of ears, and securing means connecting the associated ears and eyes.

2. In bumper construction, the combination of an impact bar having notches in its upper and lower edges adjacent its ends, the upper and lower portions of the bar between said notches and the ends of the bar being bent at substantially right angles to the side of the bar to form pairs of vertically spaced ears, a rear bar having eyes at its ends each positioned between one of said pairs of ears, and pivotal securing means connecting the associated ears and eyes.

3. In bumper construction, the combination of an impact bar and a supporting bar having a pivotal connection at their ends, said connection being formed by notching the upper and lower edges of the impact bar a short distance from its end and bending the portions of the bar between said notches and the end into substantially right angular relation to the face of the impact bar and thereby provide a pair of vertically spaced substantially horizontal ears, said ears having aligned holes therein, said supporting bar having an eye at its end positioned between said ears, and a pintle extending through said eye and said holes.

4. In bumper construction, the combination of an impact bar having its end portion bent to form a rounded convex impact surface at the end of the bumper, a supporting bar having an eye at its end, and a pintle connecting said eye with the impact bar, said end portion of the impact bar having notches formed in its upper and lower edges and the portions between said notches and the end of the bar being bent inwardly into substantially right angular relation to the face of the bar to provide a pair of vertically spaced ears between which said eye is positioned, and said ears having holes therein to receive said pintle.

In testimony whereof, I hereunto affix my signature.

GEORGE W. VEALE.